United States Patent [19]

Nagano

[11] Patent Number: 4,845,531
[45] Date of Patent: Jul. 4, 1989

[54] IMAGE READING APPARATUS

[75] Inventor: Fumikazu Nagano, Yamatokoriyama, Japan

[73] Assignee: Sharp Kabushiki Kaisha, Osaka, Japan

[21] Appl. No.: 137,610

[22] Filed: Dec. 24, 1987

[30] Foreign Application Priority Data

Dec. 27, 1986 [JP] Japan .................. 61-311207

[51] Int. Cl.$^4$ .............................................. G03B 27/72
[52] U.S. Cl. ........................................ 355/38; 355/68; 355/69
[58] Field of Search ............... 355/38, 68, 69, 14 R; 358/75.29 C

[56] References Cited

U.S. PATENT DOCUMENTS 4,647,961  3/1987  Kammoto et al. ............... 358/29 C
4,710,019 12/1987  Terashita ........................ 355/38
4,731,661  3/1988  Nagano ........................... 358/75

FOREIGN PATENT DOCUMENTS 0004852  2/1979  European Pat. Off. .
0158288  4/1985  European Pat. Off. .
0180391 10/1985  European Pat. Off. .

OTHER PUBLICATIONS

IBM Technical Disclosure Bulletin, vol. 22, No. 8A, Jan. 1980, pp. 3131-3132.

Primary Examiner—L. T. Hix
Assistant Examiner—D. Rutledge
Attorney, Agent, or Firm—Birch, Stewart, Kolasch & Birch

[57] ABSTRACT

An image reading apparatus for reading a transparent film has a light source, an exchangeable adjusting board corresponding to the transmission factor of the film, an imaging device for receiving and imaging the light passing through the adjusting board and the film, a comparison function for detecting the output of the imaging device and comparing the output of the imaging device with a predetermined output level, a control device for outputting power source control signals in response to the output of the comparison device, and a power source for energizing the light source in response to the power source control signals. Whereby, the adjusting board is imaged before the film is imaged by the imaging device, and in case the light amount of the light source is not adequate for the film, the extent of energizing the light source is adjusted for adequately imaging the film.

13 Claims, 1 Drawing Sheet

IMAGE READING APPARATUS

BACKGROUND OF THE INVENTION

The embodiments of the present invention relate to an image reading apparatus and more particularly, to an image reading apparatus such as a color copier and a color scanner used to read a transparent film.

Conventionally, the same amount of light is irradiated to all the films that are to be read regardless of the films' transmission factor. Therefore, considerations are not made even when the range of light transmission factor of the films is very wide. This causes inadequacy of a white balance adjustment. Especially, when a color positive film with a bad light transmission factor is read, the tone of the image that is required for reading is far different from that of the original film.

SUMMARY OF THE INVENTION

Accordingly, it is an object of the present invention to provide a new image reading apparatus in which the light amount of the light source is adjusted according to the non-uniform and wide range of the transmission factor of the films to be read. Thereby, the best white balance is provided.

Briefly described, in accordance with the embodiments of the present invention, an image reading apparatus for reading a transparent film comprises a light source, an exchangeable adjusting board corresponding to the transmission factor of the film, imaging means for receiving and imaging the light passing through the adjusting board and the film, comparison means for detecting the output of the imaging means and comparing the output of the imaging means with a predetermined output level, control means for outputting power source control signals according to the output of the comparison means, and a power source for energizing the light source according to the power source control signals. Whereby the adjusting board is imaged before the film is imaged by the imaging means, and, in the case when the light amount of the light source is not adequate for the film, the extent of energizing by the light source is adjusted so as to be adequate to image the film.

BRIEF DESCRIPTION OF THE DRAWINGS

The embodiments of the present invention will become fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
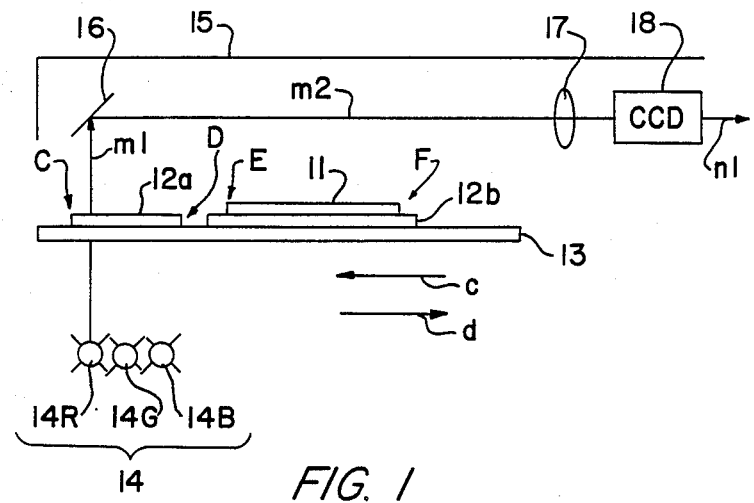
FIG. 1 is a block diagram showing the constitution of an image reading apparatus as an embodiment of the present invention.

FIG. 1 is a block diagram showing a constitution of an image reading apparatus in the preferred embodiment of the present invention. A film 11 that is to be read and imaged is set on the second adjusting board 12b which is mounted on a transparent board 13. To the left of the second adjusting board 12b in FIG. 1, a first adjusting board 12a is set on the transparent board. The first adjusting board 12a is preferably made of a milk-white resin. There are a plurality of exchangeable boards of various density extents and the most appropriate one is chosen as the first adjusting board 12a in advance by an operator which has a light transmission factor corresponding to that of the film 11. The first adjusting board 12a and the second adjusting board 12b (when 12a and 12b are generically referred, hereinafter shown as 12) are provided for the purpose of diffusing and homogenizing light from a light source 14. The board 13 moves horizontally in the directions of arrows c or d in FIG. 1.

Light sources 14R, 14G, and 14B which individually emit red, green and blue light respectively (when 14R, 14G, and 14B are generically referred, shown as 14) are provided below the board 13. Light from the light source 14 irradiates the film 11 through the board 13. The light source 14 has a length corresponding to the width of the board 13 and is a linear light source, preferably a fluorescent lamp.

On the starting of the operation, a first red light source 14R is switched on and the red light passing through the board 13 is diffused and uniformly radiated within the first adjusting board 12a to pass through the left side C of the first adjusting board 12a. At the same time, the board 13 moves in the direction of arrow c (to the left) in FIG. 1 from the point C as a base point.

Then the red light from the red light source 14R scans the first adjusting board to its right side D, and after that, scans the film 11 from its left side E to its right side F. After the red light source 14R reaches the right side F, the red light source is switched off. At the same time, the board 13 moves in the direction of arrow d (to the right) in FIG. 1 back to the base point C. Next, the green light source 14G is switched on and scans in the same way as the red light source. Finally, the blue light source 14B is switched on and scans in the same way, to complete the scan of the film 11 by all of the light sources 14R, 14G, and 14B.

In the scanning, the light from the light source 14 first passes through the first adjusting board 12a and as shown by line m1, reaches a reflection mirror 16. As shown by line m2, the light is reflected and passes through the lens 17 for being introduced to an imaging means 18 which is, preferably a charge-coupled device (CCD). Then, successively and sequentially, the light passing through the film 11 on the second adjusting board 12b is introduced in the same way as by lines m1 and m2. In this way, information regarding the white balance from the first adjusting board 12a is first introduced into line n1 after being converted to corresponding electrical signals, and then, information regarding the color and tone of the film 11 on the second adjusting board 12b is introduced to the line n1 after being converted to the corresponding electrical signal. In response to the abovementioned electrical signals, controlling results as described below, and then, the image is processed by an image processing apparatus (not shown in the figures.)

In the above embodiment, the light from the light source 14 is reflected only once by the reflection mirror 16, but the reflection is not necessarily restricted to one reflection, and it may be possible to use several reflection mirrors to lead the light in a desired direction. Also, a lens 17 that is provided in the optical path is not necessarily restricted to be in only one place.

Further, in this embodiment, the light source is a linear light source, but a surface light source and imaging means for surface-reading may be used to avoid moving the board 13.

Figure 2:
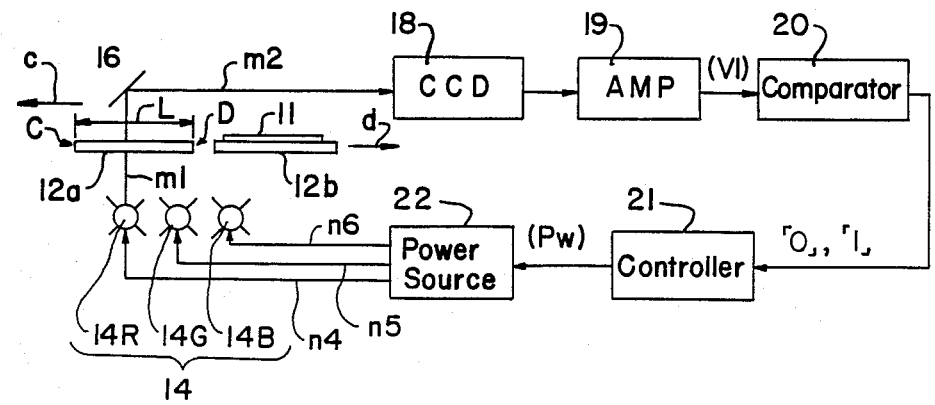
FIG. 2 is a block diagram showing the electrical constitution of an image reading apparatus as an embodiment of the present invention.

FIG. 2 is a block diagram showing the electrical constitution of an image reading apparatus for a preferred embodiment of the present invention. In FIG. 2, for the board 13 and the lens 17 are omitted and light is shown to be reflected only once by the reflection mirror 16 for convenience.

The output of the imaging means 18 is amplified by an amplifier 19 and is inputted to a comparator 20 for comparison means that is used to detect and compare the output of the imaging means 18 with a predetermined level. The comparator 20 compares the input level Vi with the predetermined specified level Vs (for example, Vs=1 V). When Vi<Vs, the comparator 20 outputs a logical '0' and when Vi>Vs, a logical '1' is output.

According to the output of the comparator 20, the controlling portion 21 is used for controlling means which outputs power controlling signals and sequentially inputs pulse controlling signals to the power source 22 which energizes the light source by power source controlling signals. Thereby, the light amount of the light source 14 is adjusted. The controlling signals are determined by the abovementioned logical output levels of the comparator 20.

When started, the controlling portion 21 gives the controlling signal Pw to the power source 22. Pw is formulated as follows:

$$Pw = T \cdot N \tag{1}$$

T is a time function relative to the time required to scan the distance L which is the distance between the two sides of the first adjusting board 12a (C–D). N is expressed as a geometrical progression $\frac{1}{2}, \frac{1}{4}, \frac{1}{8}, 1/16 \ldots$ when the largest rated light amount of the light source 14 is expressed as 1. At the beginning, N is set as $\frac{1}{2}$ and Pw is expressed as follows for introducing to the power source 22.

$$Pw = T \cdot (\tfrac{1}{2}) \tag{2}$$

Accordingly, the red light source 14R is first energized by the electric power corresponding to $\frac{1}{2}$ of the light amount and is switched on.

The light emitted from the light source 14R passes through the first adjusting board 12a and reaches the light reflection mirror 16 as shown by line m1, and then is reflected and introduced to the imaging means 18 as shown by line m2. Because a film is not set on the first adjusting board 12a, all light from the light source 14 R is introduced to the imaging means 18. Therefore, the light amount which is introduced to the imaging means 18 corresponds to the 'white' portion of the film, which means that the condition of white balance results. If, in this condition, the output level of the comparator 20 is a logical '0', the output level is too low, so the controlling portion 21 increases the level of the controlling signal Pw to the power source 22 and the following relation is satisfied.

$$Pw = T \cdot \{(\tfrac{1}{2}) + (\tfrac{1}{4})\} \tag{3}$$

If the output level is still '0', the light amount remains too small, and the controlling portion 21 further increases the level of the controlling signal Pw to the power source 22 so that the following relation is satisfied.

$$Pw = T \cdot \{(\tfrac{1}{2}) + (\tfrac{1}{4}) + (\tfrac{1}{8})\} \tag{4}$$

If the output level then becomes '1,' then for the purpose of fine adjustment of the light amount, 1/16 is subtracted from { } of the right side of the expression (4):

$$Pw = T \cdot \{(\tfrac{1}{2}) + (\tfrac{1}{4}) + (\tfrac{1}{8}) - (1/16)\} = (13/16) \cdot T \tag{5}$$

Namely, the controlling signal Pw corresponding to 13/16 of the largest rated light amount is given to the power source 22. The extent of energizing for the light source 14 is thus determined and a white balance adjustment is completed.

To the contrary, if the first adjusting board has a good transmission factor and, for example, the output level of the comparator 20 is a logical '1' at the level ($\frac{1}{2}$), then a quantity between $\frac{1}{4}$ and 1/16 is sequentially subtracted until the output level of the comparator 20 becomes logical '0.' For example, if the output level becomes '0' after the subtraction is executed five times then:

$$\tfrac{1}{2} - \{5 \cdot (1/16)\} = 3/16 \tag{6}$$

Namely, the controlling signal Pw corresponding to 3/16 of the largest rated light amount is given to the power source 22. The extent for energizing the light source 14 is thus determined and a white balance adjustment is completed.

The red light source 14R then scans the film 11 on the second adjusting board 12b from its left side E. After reading the red part of the film 11 to the right side F, the red light source 14R is switched off and at the same time, the board which is not shown in the figures goes in the direction of arrow d (to the right in FIG. 2) back to the base point C on the left side of the first adjusting board 12a. Subsequently, the green light source 14G is switched on. The green light source 14G executes a white balance adjustment and the film 11 is scanned in the same way as the red light source 14R. Then, the blue light source 14B is switched on and the same action is executed. The reading of the film 11 by the three primary color lights 14R, 14G, and 14B is thus completed.

It is an advantage of the embodiments of the present invention that films having a wide range of a light transmission factor are read with an automatic and adequate white balance adjustment, because an appropriate first adjusting board 12a is chosen which corresponds to the light transmission factor of the film to be read. Therefore, a white balance adjustment is made by first irradiating the first adjusting board 12a when the film is read.

In the abovementioned embodiment, the film to be read is a color positive film, but the present embodiment may also be applied to a negative film.

Further, in the above embodiment, after reading by one color light is completed the board goes back to the base point. For a subsequent reading by another light, the white balance is newly adjusted, but to eliminate the repetition of a white balance adjustment regarding for the same first adjusting board, the white balance adjustment may be done for only the first color (for example, red) light.

Instead of the first adjusting board 12a, any control, means may be provided for presenting information of the light transmission factor for the film into the control means. For example, a manual keyboard or switch means may be used.

While only certain embodiments of the present invention have been described, it will be apparent to those skilled in the art that various changes and modifications may be made therein without departing from the spirit and scope of the present invention as claimed.

What is claimed is:

1. An image reading apparatus for reading a transparent film comprising:
   light source means for emitting light towards the film;
   first adjusting board means having a transmission factor corresponding to the transmission factor of said film;
   imaging means for receiving and imaging the light passing through said first adjusting board means and said film;
   comparison means for detecting the output of said imaging means and comparing the output of said imaging means with a predetermined output level;
   control means for outputting power source control signals in response to the output of said comparison means; and
   power source means for energizing said light source means in response to said power source control signals,
   wherein said first adjusting board means is imaged before said film is imaged by said imaging means, and, when the light amount of said light source means is insufficient for said film, said power source for energizing said light source means is adjusted so that the light amount is adequate to image said film.

2. The image reading apparatus of claim 1, wherein said first adjusting board means is chosen from a plurality of boards having a plurality of light transmission factors.

3. The image reading apparatus of claim 1 further comprising second adjusting board means having said film disposed thereon.

4. An image reading apparatus for reading a transparent film comprising:
   light source means for emitting light toward the transparent film;
   adjusting board means, through which light emitted from said light source means passes, for identifying a specific light transmission factor of the film; and
   control means responsive to information from said adjusting board means for controlling said light source means so as to emit enough radiation to compensate for the light emission factor of the film.

5. An image reading apparatus for reading a transparent film comprising:
   light source means for emitting light towards the film;
   transparent boards means having a first adjusting board of a transmission factor corresponding to the transmission factor of the film and a second adjusting board having the film disposed thereon; and
   imaging means for receiving and imaging the light passing through said first and second adjusting boards.

6. The image reading apparatus of claim 5, wherein said imaging means comprises:
   reflection means for directing the light in a predetermined direction;
   a lens for focusing the light from said reflection means; and
   an image device for converting the light into an electrical signal.

7. The image reading apparatus of claim 6, wherein said reflection means comprises a reflection mirror.

8. The imaging reading apparatus of claim 6, wherein said reflection means comprises a plurality of reflection mirrors.

9. The image reading apparatus of claim 6, wherein said image device comprises a charge coupled device.

10. The image reading apparatus of claim 5, wherein said light source means comprises a red light source, a green light source and a blue light source.

11. The image reading apparatus of claim 5, wherein said light source means comprises a linear light source.

12. The image reading apparatus of claim 5, wherein said light source means comprises a surface light source.

13. A method for reading a transparent film by an image reading apparatus comprising the steps of:
   initializing light source means for emitting red light towards a first end of a first adjusting board having a transmission factor corresponding to the transmission factor of the film;
   laterally scanning the red light to an opposite end of said first adjusting board to develop a red light signal indicative of a white balance factor for the film in response to the step of laterally scanning by the red light;
   laterally scanning the red light across the film responsive to said red light signal for developing a red imaging signal of the white balance factor;
   switching off the red light of said light source means;
   positioning said first end of said first adjusting board adjacent to said light source means for emitting green light;
   laterally scanning the green light to an opposite end of said first adjusting board to develop a green light signal indicative of the white balance factor for the film in response to the step of laterally scanning by the green light;
   laterally scanning the green light across the film responsive to said green light sgnal for developing a green imaging signal of the white balance factor;
   switching off the green light of said light source means;
   positioning said first end of said first adjusting board adjacent to said light source means for emitting blue light;
   laterally scanning the blue light to an opposite end of said first adjusting board to develop a blue light signal indicative of the white balance factor for the film in response to the step of laterally scanning by the blue light; and
   laterally scanning the blue light across the film responsive to said blue light signal for developing a blue imaging signal of the white balance factor.

* * * * *